(No Model.)
R. W. HAGEL.
LISTING CULTIVATOR.
No. 429,520.
2 Sheets—Sheet 1.
Patented June 3, 1890.
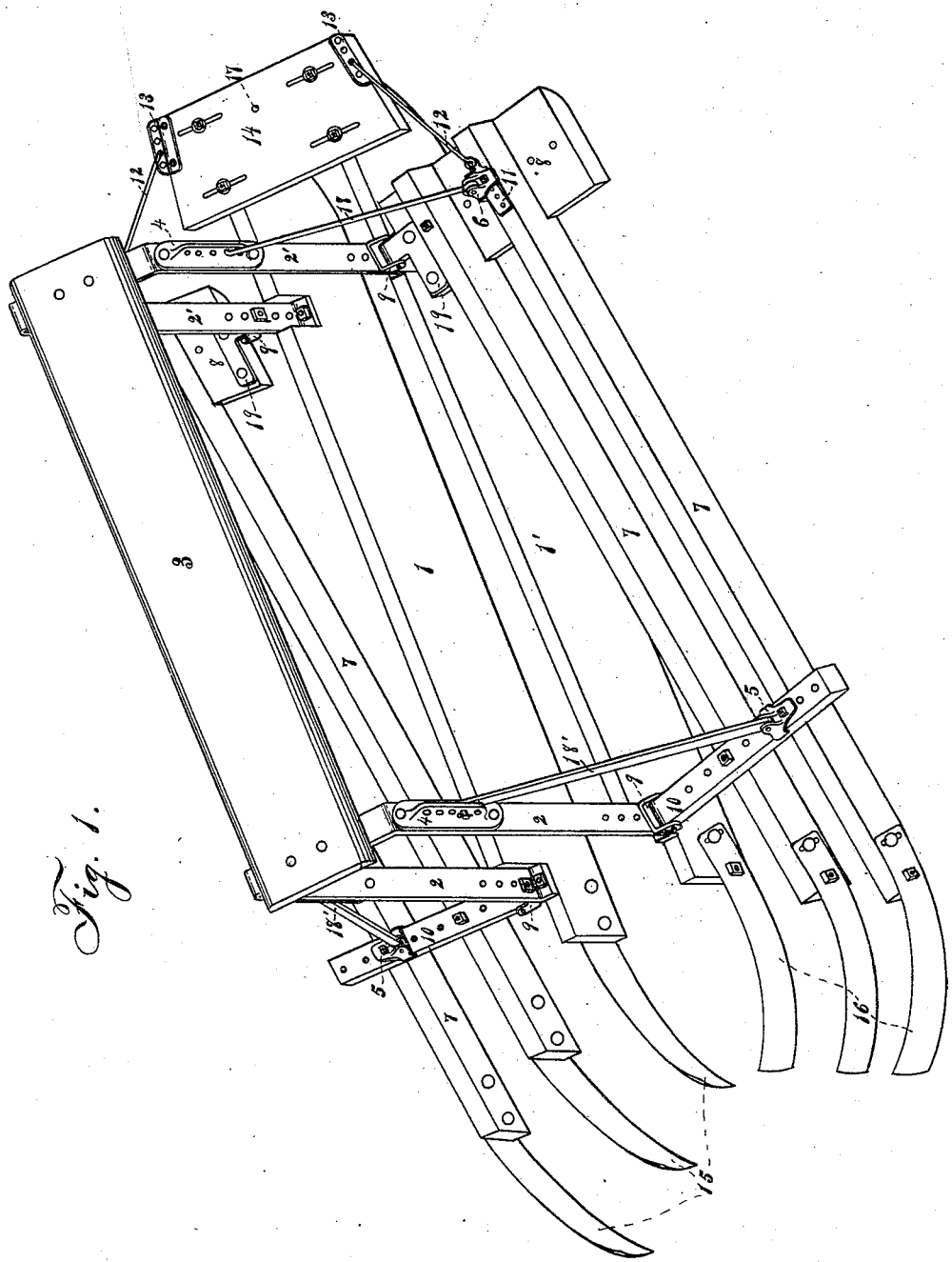
WITNESSES:
Joseph Wurzburg
Edwin D. Smith
INVENTOR
Robert W. Hagel
BY
Wm S Hamilton
ATTORNEY.

(No Model.) 2 Sheets—Sheet 2.
R. W. HAGEL.
LISTING CULTIVATOR.
No. 429,520. Patented June 3, 1890.
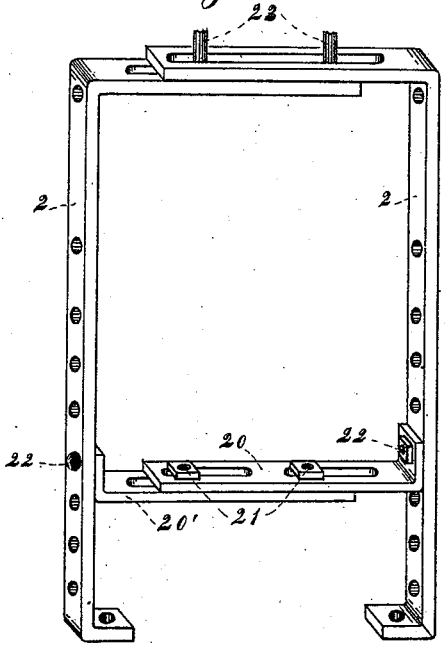
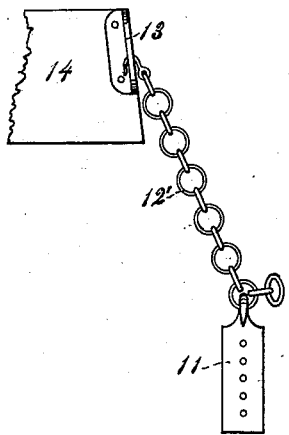
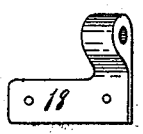
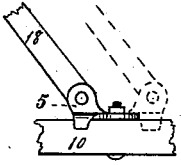
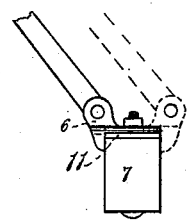
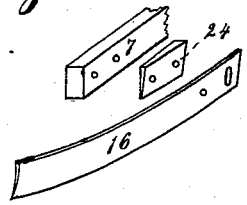
WITNESSES:
Joseph Würzburg
Edwin D. Smith
INVENTOR
Robert W. Hagel
BY
Wm. D. Hamilton
ATTORNEY.

UNITED STATES PATENT OFFICE.

ROBERT W. HAGEL, OF DOUGLAS, NEBRASKA.

LISTING-CULTIVATOR.

SPECIFICATION forming part of Letters Patent No. 429,520, dated June 3, 1890.

Application filed March 15, 1890. Serial No. 344,054. (No model.)

*To all whom it may concern:*

Be it known that I, ROBERT W. HAGEL, a citizen of the United States, residing at Douglas, in the county of Otoe and State of Nebraska, have invented certain new and useful Improvements in Listing-Cultivators, of which the following is a specification.

My invention relates to improvements in listing-cultivators; and the objects of my improvements are to provide a cultivator in which the cultivator knives or shovels and float may be adjusted to any desired position, and one which will more successfully perform the work for which a cultivator is designed than any heretofore known or used.

My invention is fully illustrated in the accompanying drawings, in which—

Figure 1 is a perspective view of my improved cultivator. Fig. 2 is a detail view of the uprights of my invention; Fig. 3, a detail view of the draft-chain and parts to which same is attached of my invention; Figs. 4, 5, and 6, detail views of castings used in connection with my invention; Fig. 7, a detail view of the cultivator-knife and of knife-beam and wedge used between same.

Reference being had to the drawings, 1 and 1' are the runners of my cultivator, upon which rest the uprights 2 and 2', as shown in Fig. 1, said uprights supporting the seat 3. To the several uprights 2 and 2' are bolted the casting 4, presenting a flange extending outward from said uprights, in which said flange are a number of openings or holes, in which are adjusted the braces 18 and 18', to be hereinafter referred to. The lower end of said brace 18' is attached to casting 5, bolted to cross-piece 10, to be hereinafter described, and reversible, as shown in detail, Fig. 5, for the purpose of giving greater adjustment to said cross-piece 10 and its attachments. The lower end of said brace 18 is attached to casting 6, bolted to outer shovel-beam 7, to be referred to, and reversible also, as shown in detail, Fig. 6, for the purpose of giving greater adjustment to the float 8, to be described. The shovel or knife beams 7 are bolted at their forward ends to the float 8 and carry at their rearward ends the shovels or knives of my invention.

8 is a float designed to mash the clods and steady the machine. This float 8 is adjustable as to the height or depth at which it works by means of the casting 19, hinged to the casting 9, which said casting 9 is bolted in one of the higher or lower openings in the upright 2', according to the height or depth at which the float is desired to work. Float 8 is also adjustable as to the inclination at which it is desired to work by means of the brace 18, which allows an adjustment at its upper end by means of the casting 4, referred to, and at its lower end by means of the casting 6, above referred to. The float 8 is also provided with a number of openings, to any of which the front ends of the knife-beams 7 may be bolted, according to the distance they are desired to work from each other and from the runners 1 and 1'.

The cross-piece 10 supports and adjusts the rear ends of the knife-beams 7. This cross-piece 10 is attached to the upright 2 by casting 9, which is bolted at one of the higher or lower openings in the upright 2, according to the height or depth at which the rear ends of the knife-beams 7 are to work. It is also adjustable as to the inclination at which the knife-beams or knives are desired to work by brace 18', which permits an adjustment at its upper end by means of the casting 4, referred to, and at its lower end by casting 5, above referred to. Cross-piece 10 is also provided with a series of openings, to any of which the knife-beams 7 may be bolted, according to the distance they are desired to work from each other and from the runners 1 and 1'.

11 is a piece of metal under the casting 6, Fig. 1, and detail, Fig. 3, hook-shaped at its forward end, to which is attached draft-brace 12 or chain 12', as shown in detail, Fig. 3. This piece 11 is provided with a number of holes to permit such adjustment rendered necessary, according to the inclination that may be given to the float 8. The draft-brace 12 or chain 12' is hooked at its rear end to piece 11 and at its forward end to the casting 13. Said casting 13 is also provided with a number of holes to increase the adjustment, and bolted to the runner cross-piece 14, to which cross-piece 14 at 17 is attached the draft-clevis. Between the piece 14 and the runners 1 and 1' is placed a block to raise the piece 14 above the runners, that it may not disturb the standing corn. The cross-piece 14 is bolted to the runners through the slots, (shown in Fig. 1,) thus permitting the distance between the forward ends of the runners to be increased or diminished, as desired. The knives or shovels 15 and 16 of my invention are attached to the rear ends of the knife-beams 7 and runners 1 and 1'. The distance apart at which the runners 1 and 1' are desired to work is regulated by means of the runner cross-piece 14, and also by means of the braces 20 and 20', bolted by bolts 22 to rear uprights 2, and provided with slots in which work the bolts 21. (Shown in detail, Fig. 2.) The top ends of the uprights 2' and 2 (shown in detail, Fig. 2) overlap each other, and each end is slotted for bolts 23. To contribute to the regulation of the distance apart at which the runners are to work, a piece of metal or wood 24 the width of the knife-beams, diagonally tapered, may be used between the knives 15 or 16 and knife-beams 7 or runners 1 1', to give such inclination to the knives as may be desired, said piece 24 being shown in detail, Fig. 7. Additional adjustment of the cultivator is obtained by the driver regulating his position upon the seat 3.

Having thus described my invention, I claim as new, and desire to secure by Letters Patent—

1. The combination, in a cultivator, of adjustable runners 1 1', uprights 2 2', knife-beams 7, float 8, cross-piece 10, cross-piece 14, and knives 15 16, all substantially as described.

2. The combination, in a cultivator, of the runners 1 1', uprights 2 2', seat 3, castings 4 5 6, knife-beams 7, float 8, castings 9 19, cross-piece 10, draft-rod 12, castings 11 13, cross-piece 14, knives 15 16, and braces 18, 18', 20, and 20', all substantially as described.

3. The combination, in a cultivator, of adjustable runners 1 1', uprights 2 2', seat 3, knife-beams 7, float 8, cross-pieces 10 14, knives 15 16, and wedge 24, all substantially as described.

In witness whereof I have hereunto affixed my signature in the presence of two witnesses.

ROBERT W. HAGEL.

Witnesses:
   JOSEPH WÜRZBURG,
   EDWIN P. SMITH.